Patented Nov. 5, 1940

2,220,261

UNITED STATES PATENT OFFICE 2,220,261

CONVERSION OF CARBON MONOXIDE WITH HYDROGEN

Wilhelm Michael, Ludwigshafen-on-the-Rhine, and Wolfgang Jaeckh, Heidelberg, Germany, assignors, by mesne assignments, to William E. Currie, New York, N. Y.

No Drawing. Application August 19, 1938, Serial No. 225,726. In Germany August 26, 1937

1 Claim. (Cl. 260—449)

The present invention relates to the conversion of carbon monoxide with hydrogen into hydrocarbons having more than one carbon atom in the molecule.

It has already been proposed to carry out the reaction of carbon monoxide with hydrogen to form hydrocarbons having more than one carbon atom in the molecule, in a liquid medium.

We have now found that the said reaction in a liquid medium can be carried out with special advantage by using as catalysts sintered heavy metals, advantageously metals of the 8th group of the periodic system, especially of the iron group and in particular iron itself.

For the preparation of the sintered metals it is preferable to start from a metal powder or a porous metal. These may be prepared in any way; for example the metal powder may be prepared by decomposition of the corresponding carbonyl compounds, such as iron carbonyl, or by reduction of pulverulent metal oxides, hydroxides or other compounds, such as nitrates, carbonates or oxalates, which are converted into the metals by reducing treatment at elevated temperature; the porous metals may be prepared by reduction of pieces of metal oxides or hydroxides or by pressing metal powders.

The sintering of the metals is carried out at temperatures above 500° C., preferably above 600° C., as for example at 700°, 800°, 900° or 1000° C., in such a manner that the space occupied by the metal becomes visibly smaller; in the case of metal powders an agglomeration of the particles of powder takes place and in the case of porous metals a decrease in the porosity takes place. Generally speaking the decrease in volume exceeds 10 per cent. The temperatures are, however, not raised to such an extent that the melting of the metals take place. Non-oxidizing gases, such as nitrogen, may be present during the sintering. In many cases it is advantageous to work in the presence of reducing gases, such as hydrogen or gases containing hydrogen. The sintering may also be carried out in vacuo. When starting from reducible metal compounds, as for example the oxides of the metals of the 8th group, these may be first converted into the metals by treatment at comparatively low temperature, as for example at 400° or 500° C., whereby no sintering takes place, the sintering then being effected at above 500° C., preferably at above 600° C., in the presence of non-oxidizing gases or in vacuo. The reduction and sintering may, however, also be carried out in one operation for example by treating an oxide at elevated temperatures with reducing gases until not only a reduction but also a sintering of the metal formed by the reduction has taken place. This may usually be readily effected by a comparatively short treatment of the metal compound, in particular the oxide, at high temperature or by a longer treatment at a lower temperature, whereby the speed of flow and the partial pressure of the reducing gas, as for example the hydrogen, should be adapted to the speed of reduction of the metal compound treated.

The sintering may also be carried out in different pressure stages, as for example by first working at atmospheric pressure and then at the same or a different temperature but under increased pressure, as for example at 2, 5, 10, 50, 100 atmospheres or more. Increased pressure may also be used when sintering in one stage.

In order to increase the activity, there may be added to the metal powder or porous metal other substances, as for example the oxides or hydroxides of aluminum, silicon dioxide, kieselguhr or compounds of copper, titanium, manganese, tungsten, molybdenum, chromium, thorium, cerium, zirconium or other rare earths. Alkalies or alkaline earths, when used in suitable amounts, also favorably influence the formation of hydrocarbons from the mixtures of carbon monoxide and hydrogen.

The liquid medium may consist of liquid or fusible hydrocarbons, as for example mineral oils or their fractions, tar oils, destructive hydrogenation products or paraffin waxes and in particular oils which have been obtained by the reaction of carbon monoxide and hydrogen, preferably under the same conditions, and which may contain substantial amounts, or consist, of constituents boiling within the boiling range of benzines.

When reacting carbon monoxide with hydrogen to form hydrocarbons in the presence of the said catalysts, such pressures are used that the liquid phase is maintained in the reaction zone; if the liquid medium has a sufficiently high boiling point, atmospheric pressure may, naturally, be used. The term liquid phase is also intended to include a state above the critical temperature of the liquid medium at which the density is not appreciably different from that of the medium at the critical temperature and at the critical pressure.

The liquid products formed are withdrawn from the reaction vessel continuously or periodically in such an amount that sufficient liquid medium remains in the reaction vessel. A part of the liquid medium may also be led in a cycle and the freshly formed constituents removed from the circulating oil by distillation.

It has also been found that the advantageous action of the said catalysts is not restricted to working in the usual liquid medium, i. e., in the liquid phase, but that very good results are obtained therewith in all cases in which a liquid surrounds the catalyst, for example in reactions where a liquid is allowed to trickle over the catalyst without a liquid level being maintained in the reaction vessel, whereby the liquid surrounding the catalyst forms only a thin coating such as is described in the specification of the application Ser. No. 116,124, filed December 12, 1936.

The reaction of the carbon monoxide with hydrogen is advantageously carried out at temperatures between about 180° and 450° C. and preferably under increased pressure, as for example pressures of 5, 10, 20, 50, 100 atmospheres or more. Atmospheric pressure may, however, also be used. Per each liter of catalyst space preferably from 3,000 to 20,000 liters of carbon monoxide-hydrogen-mixture are passed per day.

The initial gases, carbon monoxide and hydrogen, may be used in equal proportions by volume, but more carbon monoxide than hydrogen or more hydrogen than carbon monoxide may also be used. Additional amounts of carbon monoxide or hydrogen or both may also be added at different parts of the reaction vessel. In many cases it is advantageous to react gas mixtures containing more than 50 per cent, as for example from 60 to 70 per cent of carbon monoxide.

The following example will further illustrate the nature of this invention but the invention is not restricted to this example.

*Example*

Iron powder, which has been obtained by the thermal decomposition of iron carbonyl, is moistened with water, pressed into porous pills and then heated at 850° C. for 6 hours in a current of hydrogen.

After cooling, the resulting catalyst is charged into a reaction vessel, into which there is also charged a product consisting mainly of hydrocarbons and boiling between 150° and 350° C. which has been obtained by an earlier reaction of carbon monoxide and hydrogen.

A gas mixture of equal parts by volume of carbon monoxide and hydrogen is then led upwards through the reaction vessel while its interior is kept at a temperature of 330° and under a pressure of 40 atmospheres. The vapors formed by the reaction are led together with the unconverted gas into a separator also kept under pressure and at a temperature of 100° C. in which the fractions having the boiling range of middle oils and heavy oils are separated. Of the said condensed fractions, such an amount is returned to the reaction vessel that the liquid level in the reaction vessel remains constant.

The uncondensed portion is cooled to room temperature in a cooler under the same pressure, whereby mainly fractions of the boiling range of heavy benzines and benzines separate.

The residual gas is released from pressure. It may be returned to the reaction vessel or reacted in a second reaction chamber, preferably after removal of the carbon dioxide and separation of the unsaturated hydrocarbons for working up into polymerized benzine.

What we claim is:

A process for the conversion of carbon monoxide with hydrogen to produce hydrocarbons containing more than one carbon atom in the molecule which comprises operating in the presence, as catalyst, of sintered iron which is surrounded by a hydrocarbon oil.

WILHELM MICHAEL.
WOLFGANG JAECKH.